United States Patent
Yen et al.

(10) Patent No.: US 8,976,758 B2
(45) Date of Patent: Mar. 10, 2015

(54) WIRELESS COMMUNICATION SYSTEM AND METHOD FOR ADJUSTING USED DEPTH OF BUFFER UNIT IN WIRELESS COMMUNICATION SYSTEM

(75) Inventors: Kuang-Yu Yen, Taichung (TW); Chin-Yi Lin, Yun-Lin Hsien (TW)

(73) Assignee: Realtek Semiconductor Corporation, Hsinchu (TW)

( * ) Notice: Subject to any disclaimer, the term of this patent is extended or adjusted under 35 U.S.C. 154(b) by 337 days.

(21) Appl. No.: 13/017,037

(22) Filed: Jan. 30, 2011

(65) Prior Publication Data

US 2012/0009892 A1 Jan. 12, 2012

(30) Foreign Application Priority Data

Jul. 8, 2010 (TW) .............................. 099122449 A

(51) Int. Cl.
*H04W 4/00* (2009.01)
*H04B 1/10* (2006.01)

(52) U.S. Cl.
CPC ................................... *H04B 1/1027* (2013.01)
USPC .......................................................... 370/331

(58) Field of Classification Search
CPC .................................................... H04B 1/1027
USPC .......................................................... 370/331
See application file for complete search history.

(56) References Cited

U.S. PATENT DOCUMENTS

| | | | | |
|---|---|---|---|---|
| 5,828,414 A | * | 10/1998 | Perkins et al. | 375/240.01 |
| 6,108,560 A | * | 8/2000 | Navaro et al. | 455/517 |
| 6,683,889 B1 | * | 1/2004 | Shaffer et al. | 370/516 |
| 7,457,243 B2 | | 11/2008 | Meggers et al. | |
| 8,085,678 B2 | | 12/2011 | Spindola et al. | |
| 8,218,579 B2 | * | 7/2012 | Liu et al. | 370/517 |
| 8,472,320 B2 | | 6/2013 | Enstrom et al. | |
| 2003/0161471 A1 | * | 8/2003 | Jou et al. | 380/268 |
| 2005/0058146 A1 | | 3/2005 | Liu et al. | |
| 2008/0130617 A1 | * | 6/2008 | Singh et al. | 370/345 |
| 2011/0103280 A1 | * | 5/2011 | Liu et al. | 370/311 |
| 2011/0299468 A1 | * | 12/2011 | Van Nee et al. | 370/328 |
| 2012/0110405 A1 | * | 5/2012 | Toshimitsu et al. | 714/748 |

FOREIGN PATENT DOCUMENTS

CN 101076989 A 11/2007
CN 101548500 A 9/2009

OTHER PUBLICATIONS

CN Office Action dated Aug. 16, 2013.
TW Office Action mailed Jul. 26, 2013.
TW Office Action dated Jan. 23, 2014.

* cited by examiner

*Primary Examiner* — Luat Phung
*Assistant Examiner* — Saad A Waqas
(74) *Attorney, Agent, or Firm* — McClure, Qualey & Rodack, LLP

(57) ABSTRACT

A wireless communication system includes a receiving unit, a buffer unit, a determining unit, and an adjustment unit. The receiving unit receives a signal stream. The buffer unit is coupled to the receiving unit, for storing the signal stream by using a used depth. The determining unit is coupled to the receiving unit, for determining a signal receiving quality of the signal stream received from the receiving unit and accordingly generating a determining result. The adjustment unit is coupled to the determining unit and the buffer unit, for adjusting the used depth of the buffer unit according to the determining result.

14 Claims, 4 Drawing Sheets

WIRELESS COMMUNICATION SYSTEM AND METHOD FOR ADJUSTING USED DEPTH OF BUFFER UNIT IN WIRELESS COMMUNICATION SYSTEM

BACKGROUND OF THE INVENTION

1. Field of the Invention

The present invention relates to a wireless communication system, and more particularly, to a wireless communication system and a related method for adjusting a used depth of a buffer unit in the wireless communication system.

2. Description of the Prior Art

Generally speaking, before playing multimedia packets, such as a video stream or an audio stream transmitted on a network, a section of data is pre-downloaded to the buffer to be buffered. As the network is interfered to cause the actual link speed be smaller than the playing speed of the multimedia packets, the player will access the section of data stored in the buffer to avoid interruption or interference upon the playback of the multimedia packets. The size of the section of data is usually decided based on the delay allowed by the multimedia player. However, there maybe a large change in the wireless network during transmissions, such as a higher transmission speed within a short distance, a lower transmission speed within a long distance, a smoother transmission without interferences, or a poor transmission with interferences. For this reason, if the buffer with a fixed size is adopted in the wireless communication system, the multimedia packets, such as the video stream or the audio stream, cannot be played smoothly or in real time. Most of the conventional mechanisms for adjusting the size of the buffer usually adopt statistics upon the delay conditions of the past received packets to estimate the delay conditions of the future packets, and accordingly adjust the size of the buffer (i.e., the delay time of playing the packets). But this kind of method has a slow response to the wireless communication system with instantaneous interferences.

Hence, how to quickly respond to changes in the wireless network environment in order to adjust the buffer size has become an important topic of the field.

SUMMARY OF THE INVENTION

It is one of the objectives of the present invention to provide a wireless communication system and a related method for adjusting a used depth of a buffer unit in the wireless communication system to solve the abovementioned problems.

According to one embodiment, a wireless communication system is provided. The wireless communication system includes a receiving unit, a buffer unit, a determining unit, and an adjustment unit. The receiving unit receives a signal stream. The buffer unit is coupled to the receiving unit, for storing the signal stream by using a used depth. The determining unit is coupled to the receiving unit, for determining a signal receiving quality of the signal stream received from the receiving unit and accordingly generating a determining result. The adjustment unit is coupled to the determining unit, for adjusting the used depth of the buffer unit according to the determining result.

According to another embodiment, a method for adjusting a used depth of a buffer unit in a wireless communication system is provided. The method includes the following steps: receiving a signal stream; storing the signal stream by utilizing the used depth; determining a signal receiving quality of the signal stream, and accordingly generating a determining result; and adjusting the used depth of the buffer unit according to the determining result.

One advantage of the present invention is to dynamically adjust the size of the buffer unit by predicting the channel quality of the wireless communication system, such that multimedia stream can be played smoothly due to quick responses to changes in the wireless communication system. Moreover, another advantage of the present invention is to avoid frequent adjustments of the buffer unit by appropriately setting the first signal quality threshold and the second signal quality threshold, such that multimedia playback quality won't be affected.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
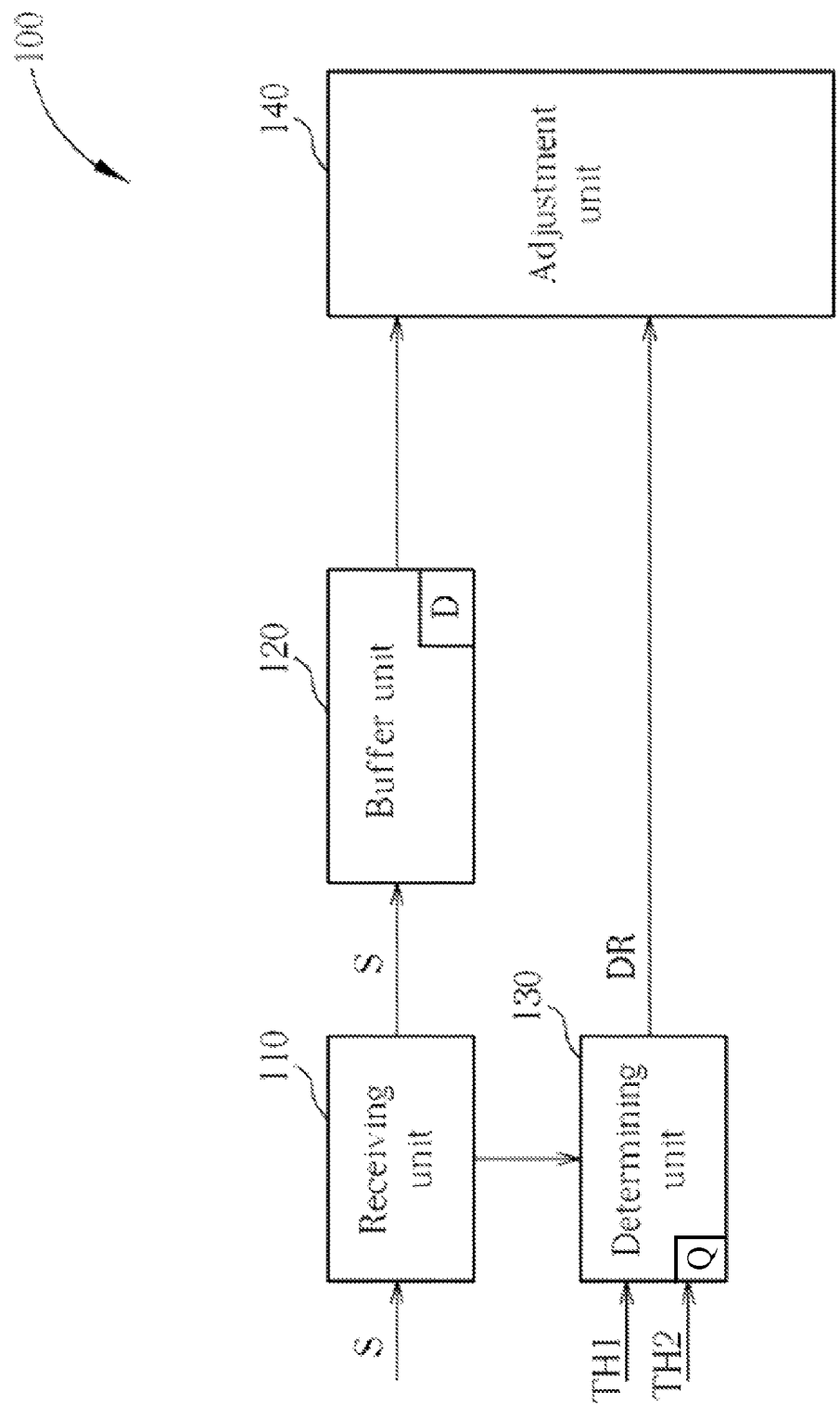
FIG. 1 is a diagram of a wireless communication system according to an embodiment of the present invention.

Please refer to FIG. 1. FIG. 1 is a diagram of a wireless communication system 100 according to an embodiment of the present invention. As shown in FIG. 1, the wireless communication system 100 includes, but is not limited to, a receiving unit 110, a buffer unit 120, a determining unit 130, and an adjustment unit 140. The receiving unit 110 receives a signal stream S. The buffer unit 120 is coupled to the receiving unit 110, for storing the signal stream S by using a used depth D. Furthermore, the determining unit 130 is coupled to the receiving unit 110, for determining a signal receiving quality Q of the signal stream S received from the receiving unit 110 and accordingly generating a determining result DR. The adjustment unit 140 is coupled to the determining unit 130 and the buffer unit 120, for adjusting the used depth D of the buffer unit 120 according to the determining result DR. In this embodiment, when the determining result DR indicates that the signal receiving quality Q does not reach a first signal quality threshold TH1, the adjustment unit 140 increases the used depth D of the buffer unit 120. On the other hand, when the determining result DR indicates that the signal receiving quality Q reaches a second signal quality threshold TH2, the adjustment unit 140 decreases the used depth of the buffer unit 120.

Figure 2:
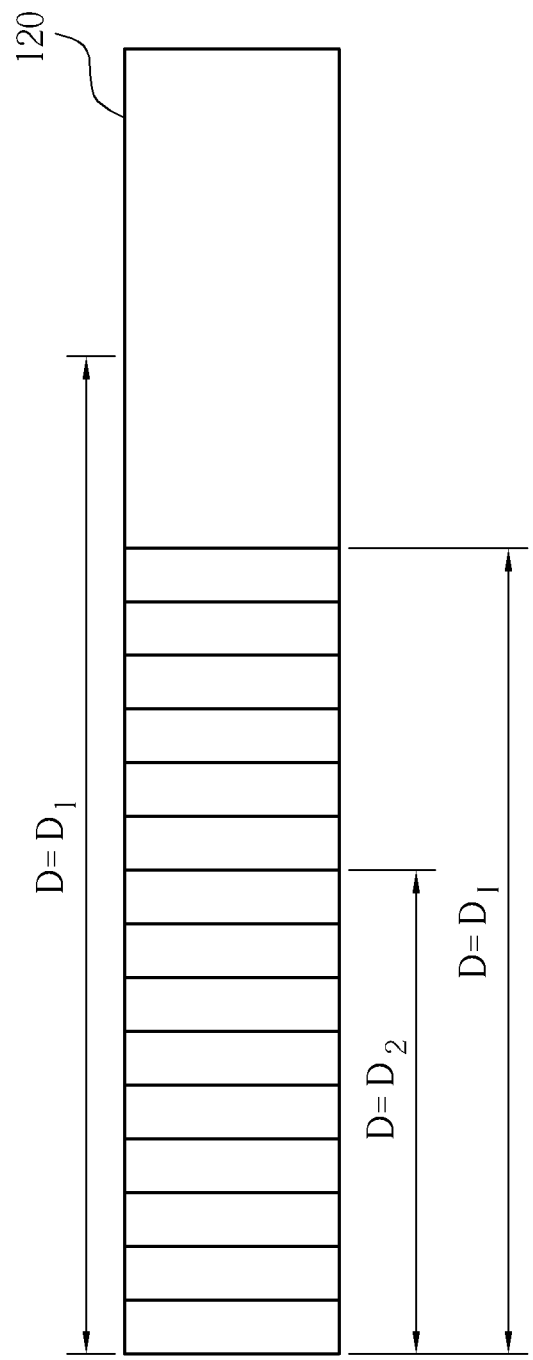
FIG. 2 is a diagram illustrating a buffer unit utilizing a used depth to store a data stream according to an embodiment of the present invention.

For example, in order to play a video stream or an audio stream smoothly, the buffer unit 120 uses an initial used depth DI (i.e., D=DI) to store the signal stream S after the receiving unit 110 receives the signal stream S related to the video stream or the audio stream. As shown in FIG. 2, which is a diagram illustrating the buffer unit 120 utilizing the used depth D to store the signal stream S according to an embodiment of the present invention. At the same time, the determining unit 130 determines whether the signal receiving quality Q of the signal stream S received from the receiving unit 110 reaches the first signal quality threshold TH1. If the signal receiving quality Q does not reach the first signal quality threshold TH1, it indicates that the wireless communication system 100 has a poor channel quality. At this time, the adjustment unit 140 increases the used depth D from the initial used depth DI to a used depth D1 (i.e., D=D1>DI) in order to smoothly play the video stream or the audio stream. On the other hand, if the signal receiving quality Q reaches the second quality threshold TH2 (in this embodiment, TH2>TH1), it indicates that the wireless communication system 100 has a better channel quality. At this time, the adjustment unit 140 decreases the used depth D from the initial used depth D1 to a used depth D2 (i.e., D=D2<DI). As a result, when a transmitter (not shown) sends out a stop control signal, the wireless communication system 100 is able to execute the stop control signal quickly since the used depth D of the buffer unit 120 has been decreased to D2. Moreover, if the signal receiving quality Q is in between the first quality threshold TH1 and the second quality threshold TH2, the adjustment unit 140 won't adjust the used depth D of the buffer unit 120. Therefore, multimedia playback quality won't be affected due to frequent adjustments of the buffer unit 120.

Please refer to FIG. 1 again. In this embodiment, the adjustment unit 140 can be implemented by a processor, and the processor executes a playback program by extracting and processing the signal stream S stored in the buffer unit 120. When the determining result DR indicates that the signal receiving quality Q does not reach the first signal quality threshold TH1, the adjustment unit 140 instructs the processor to lower an extracting rate of the buffer unit 120. As an illustration, the extracting rate of the buffer unit 120 can be decreased by 20% (i.e., the playback speed can be slowed down by 20%). When the determining result DR indicates that the signal receiving quality Q reaches the first signal quality threshold TH1, the adjustment unit 140 instructs the processor to increase the extracting rate of the buffer unit 120. As an illustration, the extracting rate of the buffer 120 can be increased by 20% (i.e., the playback speed can be speeded up by 20%). As another illustration, assume that the used depth D of the buffer unit 120 can store 30 frames. At this time, the processor can play the frames with even numbers only without playing the frames with odd numbers so as to speed up the extracting rate of the buffer unit 120.

Please note that, in the abovementioned embodiments, the signal receiving quality Q can be calculated according to a count of false alarms, a count of CRC errors, and an AMPDU subframe sequence number. Since the meanings of the count of false alarms, the count of CRC errors, and the AMPDU subframe sequence number are easily known to those skilled in the art, and further description is omitted here for brevity. Please also note that, the abovementioned parameters used for calculating the signal receiving quality Q are presented merely for describing the features of the present invention, and in no way should be considered to be limitations of the scope of the present invention. In other words, any method, capable of predicting the signal receiving quality of the channel quality of the wireless communication system without departing from the spirit of the present invention, should also belong to the scope of the present invention.

Figure 3:
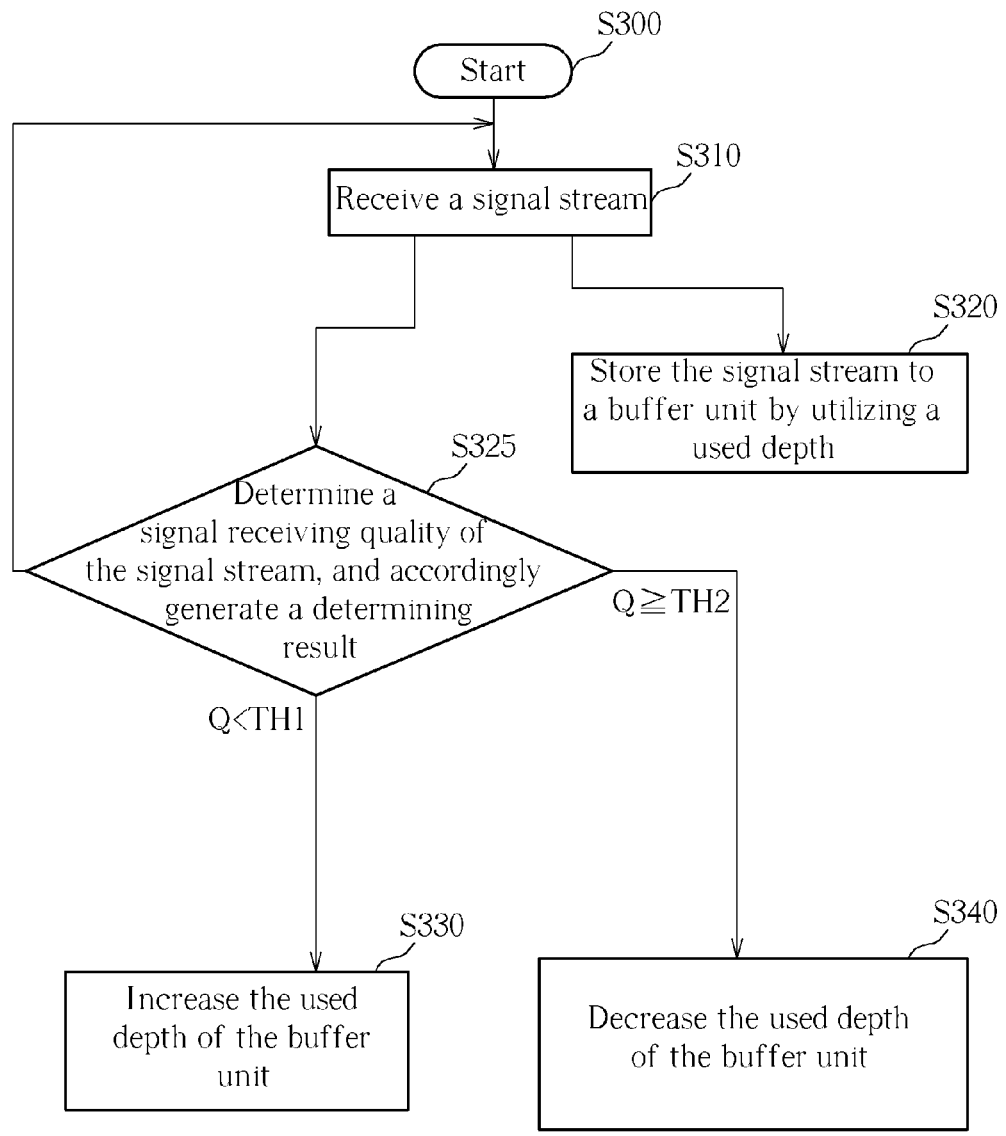
FIG. 3 is a flowchart illustrating a method for adjusting a used depth of a buffer unit in a wireless communication system according to an exemplary embodiment of the present invention.

Please refer to FIG. 3. FIG. 3 is a flowchart illustrating a method for adjusting a used depth of a buffer unit in a wireless communication system according to an exemplary embodiment of the present invention. Please note that the following steps are not limited to be performed according to the exact sequence shown in FIG. 3 if a roughly identical result can be obtained. The method includes, but is not limited to, the following steps:

Step S300: Start.
Step S310: Receive a signal stream.
Step S320: Store the signal stream to a buffer unit by utilizing a used depth.
Step S325: Determine a signal receiving quality of the signal stream, and accordingly generate a determining result. When the determining result indicates that the signal receiving quality does not reach a first signal quality threshold, go to the step S330; and when the determining result indicates that the signal receiving quality reaches a second quality threshold, go to the step S340; otherwise, go back to the step S310.
Step S330: Increase the used depth of the buffer unit.
Step S340: Decrease the used depth of the buffer unit.

How each element operates can be known by collocating the steps shown in FIG. 3 together with the elements shown in FIG. 1, and further description is omitted here for brevity. Be noted that the step S330 and the step S340 are executed by the adjustment unit 140.

Figure 4:
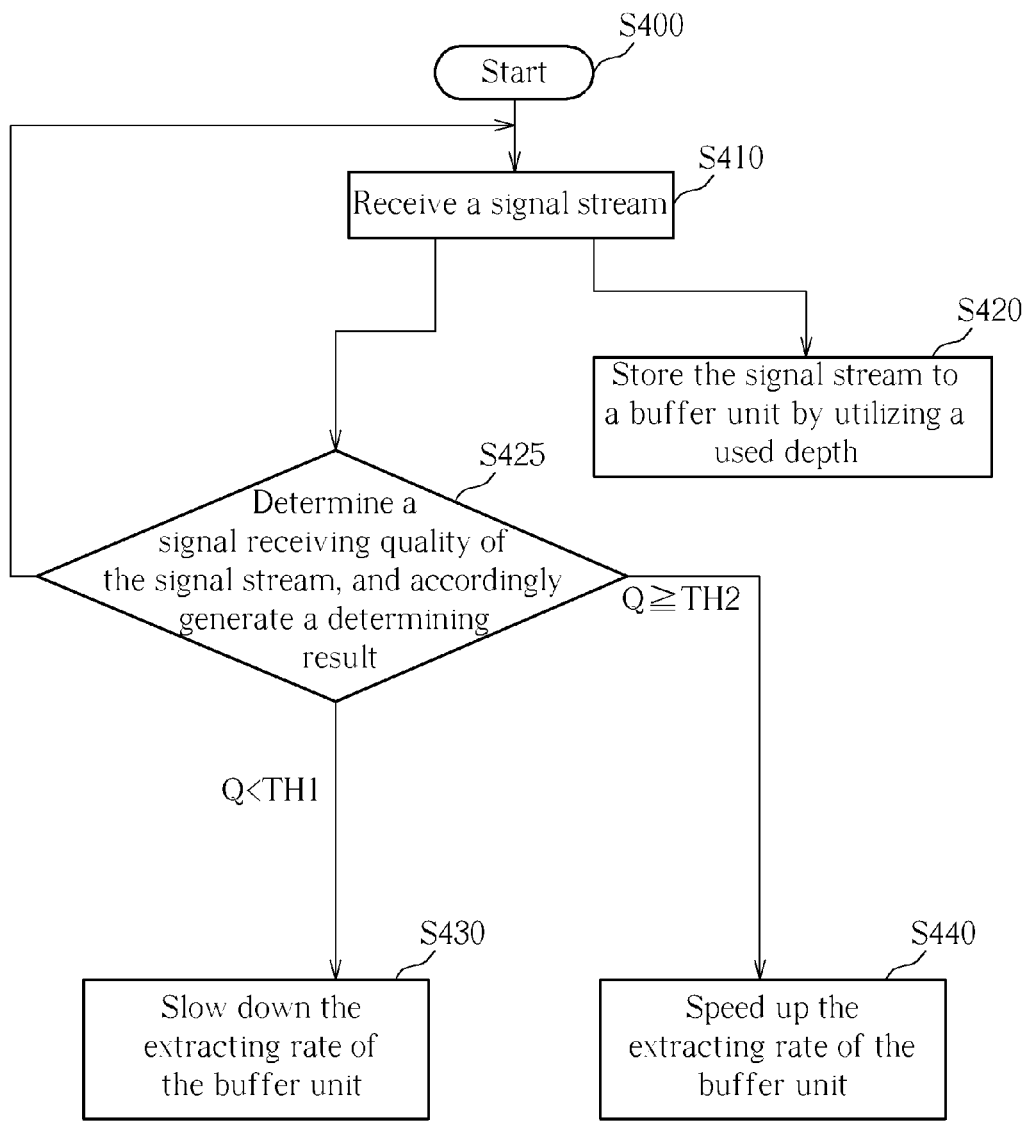
FIG. 4 is a flowchart illustrating a method for adjusting a used depth of a buffer unit in a wireless communication system according to another exemplary embodiment of the present invention.

Please refer to FIG. 4. FIG. 4 is a flowchart illustrating a method for adjusting a used depth of a buffer unit in a wireless communication system according to another exemplary embodiment of the present invention. Please note that the following steps are not limited to be performed according to the exact sequence shown in FIG. 4 if a roughly identical result can be obtained. The method includes, but is not limited to, the following steps:

Step S400: Start.
Step S410: Receive a signal stream.
Step S420: Store the signal stream to a buffer unit by utilizing a used depth.
Step S425: Determine a signal receiving quality of the signal stream, and accordingly generate a determining result. When the determining result indicates that the signal receiving quality does not reach a first signal quality threshold, go to the step S430; and when the determining result indicates that the signal receiving quality reaches a second quality threshold, go to the step S440; otherwise, go back to the step S410.
Step S430: Slow down the extracting rate of the buffer unit.
Step S440: Speed up the extracting rate of the buffer unit.

How each element operates can be known by collocating the steps shown in FIG. 4 together with the elements shown in FIG. 1, and further description is omitted here for brevity. Be noted that the steps S430 and S440 are executed by the processor.

Please note that, the steps of the abovementioned flowchart are merely a practicable embodiment of the present invention, and in no way should be considered to be limitations of the scope of the present invention. The method can include other intermediate steps or several steps can be merged into a single step without departing from the spirit of the present invention.

The abovementioned embodiments are presented merely for describing the features of the present invention, and in no way should be considered to be limitations of the scope of the present invention. In summary, the present invention provides a wireless communication system and a related method for adjusting a used depth of a buffer unit in the wireless communication system. By predicting the channel quality of the wireless communication system so as to dynamically adjust the size of the buffer unit, multimedia stream can be played smoothly due to quick responses to changes in the wireless communication system. Furthermore, by appropriately setting the first signal quality threshold and the second signal quality threshold, multimedia playback quality won't be affected due to frequent adjustments of the buffer unit 120.

Those skilled in the art will readily observe that numerous modifications and alterations of the device and method may be made while retaining the teachings of the invention.

What is claimed is:

1. A wireless communication system, comprising:
   a receiving unit, for receiving a signal stream;
   a buffer unit, coupled to the receiving unit, for storing the signal stream by utilizing a used depth;
   a determining unit, coupled to the receiving unit, for determining a signal receiving quality of the signal stream received from the receiving unit and accordingly generating a determining result, wherein the determining result is indicative of channel quality of the wireless communication system, wherein the determining unit calculates the signal receiving quality according to a count of false alarms, a count of CRC errors, and an AMPDU subframe sequence number; and
   an adjustment unit, coupled to the determining unit, for adjusting the used depth of the buffer unit according to the determining result and a plurality of signal quality thresholds.

2. The wireless communication system of claim 1, wherein when the determining result indicates that the signal receiving quality does not reach a first signal quality threshold, the adjustment unit increases the used depth of the buffer unit.

3. The wireless communication system of claim 1, wherein the adjustment unit is a processor, for extracting and processing the signal stream stored in the buffer unit; and when the determining result indicates that the signal receiving quality does not reach a first signal quality threshold, the processor slows down an extracting rate of the buffer unit.

4. The wireless communication system of claim 1, wherein when the determining result indicates that the signal receiving quality reaches a second signal quality threshold, the adjustment unit decreases the used depth of the buffer unit.

5. The wireless communication system of claim 1, wherein the adjustment unit is a processor, for extracting and processing the signal stream stored in the buffer unit; and when the determining result indicates that the signal receiving quality reaches a second signal quality threshold, the processor speeds up an extracting rate of the buffer unit.

6. A method for adjusting a used depth of a buffer unit in a wireless communication system, comprising the following steps:
   receiving a signal stream;
   storing the signal stream by utilizing the used depth;
   determining a signal receiving quality of the signal stream, and accordingly generating a determining result, wherein the determining result is indicative of channel quality of the wireless communication system, wherein the determining operation calculates the signal receiving quality according to a count of false alarms, a count of CRC errors, and an AMPDU subframe sequence number; and
   adjusting the used depth of the buffer unit according to the determining result and a plurality of signal quality thresholds.

7. The method of claim 6, wherein the step of adjusting the used depth of the buffer unit according to the determining result comprises:
   when the determining result indicates that the signal receiving quality does not reach a first signal quality threshold, increasing the used depth of the buffer unit.

8. The method of claim 6, wherein the step of adjusting the used depth of the buffer unit according to the determining result comprises:
   extracting and processing the signal stream stored in the buffer unit; and
   when the determining result indicates that the signal receiving quality does not reach a first signal quality threshold, slowing down an extracting rate of the buffer unit.

9. The method of claim 6, wherein the step of adjusting the used depth of the buffer unit according to the determining result comprises:
   when the determining result indicates that the signal receiving quality reaches a second signal quality threshold, decreasing the used depth of the buffer unit.

10. The method of claim 6, wherein the step of adjusting the used depth of the buffer unit according to the determining result comprises:
    extracting and processing the signal stream stored in the buffer unit; and
    when the determining result indicates that the signal receiving quality reaches a second signal quality threshold, speeding up an extracting rate of the buffer unit.

11. A wireless communication system, comprising:
    a receiving unit configured to receive a signal stream;
    a buffer unit, coupled to the receiving unit, and configured to store the signal stream, the buffer unit having an used depth level;
    a determining unit, coupled to the receiving unit, and configured to calculate a signal receiving quality of the signal stream according to a plurality of signal characteristics and accordingly generate a determining result, wherein the determining result is indicative of channel quality of the wireless communication system, wherein the determining unit calculates the signal receiving quality according to a count of false alarms, a count of CRC errors, and an AMPDU subframe sequence number; and
    an adjustment unit, coupled to the determining unit, and configured to adjust the used depth of the buffer unit according to the determining result and a plurality of signal quality thresholds.

12. The wireless communication system of claim 11, wherein the plurality of signal characteristics comprises a plurality of count values corresponding to predetermined conditions.

13. The wireless communication system of claim 11, wherein in response to a determination that the signal receiving quality does not reach a first signal quality threshold, the adjustment unit reduces a rate of extraction of the buffer unit by a predetermined amount.

14. The wireless communication system of claim 11, wherein in response to a determination that the signal receiving quality reaches a second signal quality threshold, the adjustment unit increases a rate of extraction of the buffer unit by a predetermined amount.

* * * * *